United States Patent
Fukumoto et al.

(10) Patent No.: US 12,516,154 B2
(45) Date of Patent: Jan. 6, 2026

(54) METHOD FOR PRODUCTION POLYHYDROXYBUTYRIC ACID RESIN

(71) Applicant: KANEKA CORPORATION, Osaka (JP)

(72) Inventors: Asuka Fukumoto, Hyogo (JP); Shogo Hirota, Hyogo (JP); Masaru Hirano, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 712 days.

(21) Appl. No.: 17/818,379

(22) Filed: Aug. 9, 2022

(65) Prior Publication Data

US 2022/0380530 A1 Dec. 1, 2022

Related U.S. Application Data

(63) Continuation of application No. PCT/JP2021/001275, filed on Jan. 15, 2021.

(30) Foreign Application Priority Data

Mar. 18, 2020 (JP) ................. 2020-048183

(51) Int. Cl.
| | |
|---|---|
| *C08G 63/81* | (2006.01) |
| *C02F 1/44* | (2023.01) |
| *C08G 63/06* | (2006.01) |
| *C02F 101/10* | (2006.01) |
| *C02F 103/38* | (2006.01) |

(52) U.S. Cl.
CPC ............. *C08G 63/81* (2013.01); *C02F 1/44* (2013.01); *C08G 63/06* (2013.01); *C02F 2101/10* (2013.01); *C02F 2103/38* (2013.01)

(58) Field of Classification Search
None
See application file for complete search history.

(56) References Cited

U.S. PATENT DOCUMENTS

| | | | |
|---|---|---|---|
| 5,292,860 A | 3/1994 | Shiotani et al. | |
| 2017/0260390 A1 | 9/2017 | Stufano et al. | |
| 2018/0009688 A1* | 1/2018 | Ertel | ........... C02F 3/305 |
| 2019/0330089 A1 | 10/2019 | Takita | |

FOREIGN PATENT DOCUMENTS

| | | |
|---|---|---|
| EP | 0533144 A2 | 3/1993 |
| EP | 2048224 A1 | 4/2009 |
| EP | 3476943 A1 | 5/2019 |
| JP | H5-93049 A | 4/1993 |
| JP | 7-31 489 A | 2/1995 |
| JP | 2005-348640 A | 12/2005 |
| JP | 2007-260664 A | 10/2007 |
| JP | 2008-193940 A | 8/2008 |
| JP | 2008-237182 A | 10/2008 |
| JP | 2009-195179 A | 9/2009 |
| JP | 2012-115145 A | 6/2012 |
| JP | 2017-531447 A | 10/2017 |
| WO | WO 2008/010296 A1 | 1/2008 |
| WO | WO 2016/050570 A1 | 4/2016 |
| WO | WO 2017/221755 A1 | 12/2017 |

OTHER PUBLICATIONS

Endless Waters, What's the difference between distilled and purified water, Nov. 7, 2019, accessed at https://endlesswaters.com/whats-the-difference-between-distilled-and-purified-water/ (Year: 2019).*
Clifton, What is distilled water?, The Chemistry Blog, Sep. 13, 2018, accessed at https://www.chemicals.co.uk/blog/what-is-distilled-water? (Year: 2018).*
Koller, Recycling of waste streams of the biotechnological poly(hydroxyalkanoate) production of Haloferax mediterranei on whey, International Journal of Polymer Science, 2015, 370164 (Year: 2015).*
International Search Report dated Mar. 23, 2021, in PCT/JP2021/001275 (3 pages).

* cited by examiner

*Primary Examiner* — Randy P Gulakowski
*Assistant Examiner* — Audra J Destefano
(74) *Attorney, Agent, or Firm* — Oblon, McClelland, Maier & Neustadt, L.L.P.

(57) ABSTRACT

In one or more embodiments, the present invention relates to a method for producing a polyhydroxybutyrate-based resin. The method includes (a) disrupting or solubilizing microbial cells containing a polyhydroxybutyrate-based resin, and (b) separating the polyhydroxybutyrate-based resin from a composition obtained by the process (a). The process (a) and the process (b) use water with a calcium ion concentration of 4.5 mg/L or less. The water used in the process (a) and the process (b) is preferably obtained by subjecting wastewater that is discharged from the production process of the polyhydroxybutyrate-based resin to microbial anaerobic and aerobic treatments, subsequently pre-filtration by a membrane bioreactor process, and further filtration with a calcium ion removal membrane. This method provides the polyhydroxybutyrate-based resin with good color tone and high thermal stability.

14 Claims, No Drawings

METHOD FOR PRODUCTION POLYHYDROXYBUTYRIC ACID RESIN

CROSS-REFERENCE TO RELATED APPLICATIONS

The present application is a continuation of International Application No. PCT/JP2021/001275 filed on Jan. 15, 2021, and claims priority to Japanese Application No. 2020-048183 filed on Mar. 18, 2020, the disclosures of all of which are incorporated herein by reference in their entireties.

TECHNICAL FIELD

The present invention relates to a method for producing a polyhydroxybutyrate-based resin.

BACKGROUND ART

Biodegradable plastics can be completely broken down by microorganisms in soil and water, and thus incorporated into the natural carbon cycle process. Therefore, biodegradable plastics are expected to be actively used as an environmentally friendly plastic material with almost no adverse effects on the ecosystem. Typical plant-derived biodegradable plastics such as polyhydroxybutyrate have attracted attention. The polyhydroxybutyrate is an aliphatic polyester (thermoplastic polyester) that is produced by microorganisms using plant-derived natural organic acids and fats and oils as a carbon source, and that is accumulated in cells as an energy storage substance.

The polyhydroxybutyrate produced by microorganisms is water insoluble and is accumulated usually in the form of granules in cells of the microorganisms. In order to use the polyhydroxybutyrate as a plastic, the polyhydroxybutyrate needs to be separated and taken out of the cells. Patent Document 1 discloses, e.g., a method for separating and purifying polyhydroxybutyrate, in which the addition of alkali is combined with high-pressure disruption. Patent Document 2 discloses, e.g., a method for separating and purifying polyhydroxybutyrate, in which physical cell disruption is combined with chemical treatment with an enzyme and a surfactant.

PRIOR ART DOCUMENTS

Patent Documents

Patent Document 1: JP H7(1995)-31489 A
Patent Document 2: JP 2008-193940 A

DISCLOSURE OF INVENTION

Problem to be Solved by the Invention

However, the polyhydroxybutyrate obtained by the separation methods as disclosed in Patent Documents 1 and 2 is easily colored and has low thermal stability. Thus, the molecular weight of the polyhydroxybutyrate is reduced when it is heated at a high temperature.

To solve the above problems, the present invention provides a method for producing a polyhydroxybutyrate-based resin with good color tone and high thermal stability.

Means for Solving Problem

One or more embodiments of the present invention relate to a method for producing a polyhydroxybutyrate-based resin. The method includes (a) disrupting or solubilizing microbial cells containing a polyhydroxybutyrate-based resin, and (b) separating the polyhydroxybutyrate-based resin from a composition obtained by the process (a). The process (a) and the process (b) use water with a calcium ion concentration of 4.5 mg/L or less.

Effects of the Invention

The production method of the present invention can provide a polyhydroxybutyrate-based resin that has good color tone and high thermal stability.

Description of the Invention

The present inventors conducted extensive studies to solve the above problems and found that by using water with a calcium ion concentration in a specific range in both the process (a) of disrupting or solubilizing microbial cells containing a polyhydroxybutyrate-based resin (also referred to simply as "PHB" in the following) and the process (b) of separating the polyhydroxybutyrate-based resin from a composition obtained by the process (a), the polyhydroxybutyrate-based resin thus produced can have good color tone and can also avoid reducing its molecular weight even when heated at a high temperature of e.g., 160° C. Further, a sodium ion concentration of the water used in the processes (a) and (b) is preferably set in a specific range.

[Low Calcium Ion Water]

In one or more embodiments of the present invention, the calcium ion concentration of the water used in the processes (a) and (b) is 4.5 mg/L or less, preferably 3.0 mg/L or less, and more preferably 2.0 mg/L or less from the viewpoint of improving the color tone and the thermal stability. In one or more embodiments of the present invention, the water used in the processes (a) and (b) is ideally free of calcium ions, but the calcium ion concentration may be either 0.001 mg/L or more or 0.005 mg/L or more in view of practical use.

In one or more embodiments of the present invention, the sodium ion concentration of the water used in the processes (a) and (b) is preferably 450 mg/L or less, more preferably 250 mg/L or less, and further preferably 220 mg/L or less from the viewpoint of improving the color tone and the thermal stability. In one or more embodiments of the present invention, the water used in the processes (a) and (b) is ideally free of sodium ions, but the sodium ion concentration may be either 0.05 mg/L or more or 0.1 mg/L or more in view of practical use.

Any water having a calcium ion concentration of 4.5 mg/L or less may be used in the processes (a) and (b). In order to save the amount of water used and reduce the environmental impact, it is preferable that wastewater that is discharged from the production process of the polyhydroxybutyrate-based resin can be treated and reused. For this reason, the wastewater may be subjected to microbial anaerobic and aerobic fermentation treatments, subsequently pre-filtration by a membrane bioreactor process, and further filtration with a calcium ion removal membrane to provide the treated water. The wastewater to be treated includes liquid waste that comes out of any process, including the processes (a) and (b), during the production of the polyhydroxybutyrate-based resin.

The microbial anaerobic and aerobic treatments and the pre-filtration by the membrane bioreactor process are not particularly limited and may be performed by general methods used for water treatment. For example, an anaerobic treatment apparatus may include an acid-producing tank and a methane-producing tank (EGSB reactor). Specifically, high-molecular-weight carbohydrates and lipids are decomposed into organic acids and lower alcohols by the action of acid-producing bacteria in the acid-producing tank, and the organic acids and lower alcohols are then decomposed into methane gas and carbon dioxide gas by the action of granular methane-producing bacteria in the methane-producing tank (EGSB reactor). Moreover, an aerobic treatment apparatus may include, e.g., a denitrification tank (activated sludge treatment tank) and an aeration tank (activated sludge treatment tank). The aerobic treatment uses this apparatus and allows the organic substances that have not been decomposed by the anaerobic treatment to be decomposed by the action of aerobic bacteria in the aeration tank The aerobic treatment apparatus may also include a denitrification tank (activated sludge treatment tank), an aeration tank (activated sludge treatment tank), a second denitrification tank (activated sludge treatment tank), and a re-aeration tank (activated sludge treatment tank). The pre-filtration by the membrane bioreactor process can be performed by, e.g., installing a UF or MF membrane for submerged MBR in the aeration tank (activated sludge treatment tank) or the re-aeration tank (activated sludge treatment tank).

In one or more embodiments of the present invention, the calcium ion removal membrane is preferably one or more selected from the group consisting of an NF membrane and an RO membrane because these membranes have high calcium ion removal performance.

In one or more embodiments of the present invention, an $MgSO_4$ rejection rate of the NF membrane or the RO membrane at a temperature of 20° C. and under a pressure of 3000 kPa is preferably 60% or more and 100% or less, more preferably 70% or more and 100% or less, and further preferably 90% or more and 100% or less. When the $MgSO_4$ rejection rate is 60% or more, the calcium ion permeability of the membrane is not increased, so that the treated water is suitably used in the processes (a) and (b), making it easy to improve the color tone of the polyhydroxybutyrate-based resin and also to prevent a reduction in the molecular weight of the polyhydroxybutyrate-based resin at a high temperature.

In one or more embodiments of the present invention, the transmembrane pressure difference of the NF membrane or the RO membrane during filtration is not particularly defined and is preferably 0.4 MPa or more and 4.14 MPa or less, and more preferably 0.5 MPa or more and 2.5 MPa or less in terms of a calcium ion removal rate and a sodium ion removal rate. When the transmembrane pressure difference is 0.4 MPa or more, the water permeate flow and the ion removal rate are not reduced. When the transmembrane pressure difference is 4.14 MPa or less, the membrane is not easily damaged.

In one or more embodiments of the present invention, the permeation rate of the NF membrane or the RO membrane during filtration is not particularly defined and is preferably, e.g., 0.01 L/min or more and 2000 L/min or less, and more preferably 0.5 L/min or more and 1500 L/min or less. When the permeation rate is 0.01 L/min or more, the productivity is better.

In one or more embodiments of the present invention, the water temperature during filtration with the NF membrane or the RO membrane is not particularly defined and is preferably 50° C. or less, and more preferably 45° C. or less. When the water temperature is 50° C. or less, the membrane is less likely to be degraded.

[Microbial Cells Containing PHB]

In one or more embodiments of the present invention, microbial cells containing a polyhydroxybutyrate-based resin can be obtained by culturing microorganisms having the ability to produce the PHB.

In one or more embodiments of the present invention, the polyhydroxybutyrate-based resin is a general term for polymers containing 3-hydroxybutyric acids (also referred to as 3HB in the following) as monomer units. The PUB may be ether poly(3-hydroxybutyrate), which is a homopolymer of 3-hydroxybutyric acid, or a copolymer of 3-hydroxybutyric acid and other 3-hydroxyalkanoic acids. The other 3-hydroxyalkanoic acids may include one or more monomers selected from the group consisting of 3-hydroxyhexanoic acid (also referred to as 3HH in the following), 3-hydroxyheptandc adid, 3-hydroxyoctanoic acid, 3-hydroxynonanoic acid, 3-hydroxydecanoic acid, 3-hydroxyundecanoic acid, 3-hydroxydodecanoic acid, 3-hydroxytridecanoic acid, 3-hydroxytetradecanoic acid, 3-hydroxypentadecanoic acid, and 3-hydroxyhexadecanoic acid.

The PHB is preferably, e.g., poly(3-hydroxybutyrate), poly(3-hydroxybutyrate-co-3-hydroxyhexanoate), or poly(3-hydroxybutyrate-co-3-hydroxyoctanoate), and particularly preferably poly(3-hydroxybutyrate-co-3-hydroxyhexanoate) because they are easy to produce industrially. The composition ratio of the monomer units in the binary copolymer PHBH of 3HB and 3HH is not particularly limited. For example, the 3HH unit may be either 1 mol % or more and 50 mol % or less, or 1 mol % or more and 25 mol % or less, or 1 mol % or more and 15 mol % or less, where the total of all monomer units is given as 100 mol %.

In one or more embodiments of the present invention, the microorganisms having the ability to produce the PUB are not particularly limited and may include, e.g., microorganisms isolated from nature, microorganisms deposited in strain depositories (WO, ATCC, etc.), and mutants or transformants of these microorganisms. Specific examples of the microorganisms include *Cupriavidus, Alcaligenes, Raistonia, Pseudomonas Azotobacter, Nocardia*, and *Aeromonas*. In particular, strains such as *Alcaligenes lipolyfith* (*A. lipolytica*), *Alcaligenes latus* (*A. latus*), *Aeromonas caviae* (*A. caviae*), *Aeromonas hydryphila* (*A. hydrophila*), and *Cupriavidus necator* (*C. necator*) are preferred. When microorganisms are inherently unable to produce the PUB or able to produce only a small amount of the PUB, transformants may also be obtained by introducing the target PUB synthase genes and/or their mutants into those microorganisms. The PUB synthase genes for producing such transformants are not particularly limited and are preferably PHB synthase genes derived from *Aeromonas caviae*.

The above microorganisms are cultured under appropriate conditions, and thus can accumulate PUB within the cells. The culture method is not particularly limited and may be any method as disclosed in, e.g., JP H05(1993)-93049 A or WO 2008/010296 A1. As microbial cells containing the PUB, a cell culture solution in which the PUB-containing microbial cells have been grown can be used directly or after being sterilized. In the latter case, the cell culture solution is heated to kill the cells. The sterilization may be performed by, e.g., heat-treating the cell culture solution at 50° C. or more and 80° C. or less for 5 minutes or more and 120 minutes or less.

[Process (a)]

In the process (a), microbial cells containing the PHB are disrupted or solubilized. The process (a) includes, e.g., at least one treatment selected from the group consisting of a chemical treatment and a physical disruption treatment.

The chemical treatment may use at least one compound selected from the group consisting of an alkaline compound, a proteolytic enzyme, and a cell wall degrading enzyme.

Any alkaline compound may be used that is capable of breaking down the cell walls of the PHB-containing microbial cells and allowing the PUB in the cells to flow out of the cells. Examples of the alkaline compound include the following: alkali metal hydroxides such as sodium hydroxide, potassium hydroxide, and lithium hydroxide; alkali metal carbonates such as sodium carbonate and potassium carbonate; alkali metal hydrogencarbonates such as sodium hydrogencarbonate and potassium hydrogencarbonate; alkali metal salts of organic acids such as sodium acetate and potassium acetate; alkali metal borates such as borax; alkali metal phosphates such as trisodium phosphate, disodium hydrogen phosphate, tripotassium phosphate, and dipotassium hydrogen phosphate; alkaline-earth metal hydroxides such as barium hydroxide; and aqueous ammonia. In particular, the alkaline compound is preferably one or more selected from the group consisting of sodium hydroxide, sodium carbonate, potassium hydroxide, and lithium hydroxide in terms of industrial production and cost reduction.

The proteolytic enzyme is not particularly limited and may be, e.g., alcalase, pepsin, trypsin, papain, chymotrypsin, aminopeptidase, or carboxypeptidase. Specific examples of the proteolytic enzyme include the following; "Protease A," "Protease P," and "Protease N" (which are manufactured by Amano Enzyme Inc); and "Alcalase," "Esperase," "Savinase," and "Everlase" (which are manufactured by Novozymes Japan Ltd). These enzymes are applicable to industrial use and also suitable in terms of decomposition activity.

The cell wall degrading enzyme is not particularly limited and may be, e.g., lysozyme, amylase, cellulase, maltase, saccharase, α-glycosidase, or β-glycosidase. Among these enzymes, lysozyme is preferred in terms of bacteriolytic effect. Specific examples of the cell wall degrading enzyme include the following: "Lysozyme" (manufacturedby Shandong Provincial Huayuan Economic and Trade Co., Ltd.); "Biozyme A," "Cellulase A (Amano) 3," "Cellulose T (Amano) 4," and "α-Glucosidase (Amano)" (which are manufactured by Amano Enzyme Inc.); and "Termamyl" and "Cellusoft" (which are manufactured by Novozymes Japan Ltd.). These enzymes are applicable to industrial use.

The treatment with the above enzymes is preferably performed in the presence of a surfactant in terms of providing a high separation and purification effect. Moreover, the enzyme treatment may use an enzyme composition that contains, e.g., an enzyme and one or more additives selected from the group consisting of an enzyme stabilizer, a surfactant, and an anti-redeposition agent.

Examples of the surfactant include an anionic surfactant, a cationic surfactant, an amphoteric surfactant, and a nonionic surfactant. The anionic surfactant and/or the nonionic surfactant are preferred because they are highly effective in removing residues after disruption of the cell membrane. The anionic surfactant is suitable for the removal of e.g., proteins. The nonionic surfactant is suitable for the removal of, e.g., fatty acids and fats and oils. The anionic surfactant and the nonionic surfactant may be used in combination. In such a case, the weight ratio of the anionic surfactant to the nonionic surfactant is preferably 1/100 to 100/10, more preferably 5/100 to 100/20, further preferably 5/100 to 100/100, and particularly preferably 5/100 to 50/100.

Examples of the anionic surfactant include alkyl sulfates, alkylbenzene sulfonates, alkyl sulfate salts, alkenyl sulfates, alkyl ether sulfates, alkenyl ether sulfates, α-olefin sulfonates, α-sulfo fatty acid salts, esters of α-sulfo fatty acid salts, alkyl ether carboxylates, alkenyl ether carboxylates, an amino acid surfactant, and an N-awl amino acid surfactant. In particular, an alkyl sulfate having an alkyl group with 12 to 14 carbon atoms, a linear alkylbenzene sulfonate having an alkyl group with 12 to 16 carbon atoms, an alkyl sulfate salt having an alkyl group with 10 to 18 carbon atoms, and an alkyl ether sulfate having an alkyl group with 10 to 18 carbon atoms are preferred. Examples of the counter ion may include alkali metals such as sodium and potassium, alkaline-earth metals such as magnesium, and alkanolamines such as monoethanolamine, diethanolamine, and triethanolamine.

Examples of the nonionic surfactant include polyoxyethylene alkyl ether, polyoxyethylene alkyl phenyl ether, polyoxyalkylene alkyl ether, fatty acid sorbitan ester, alkyl polyglucoside, fatty acid diethanolamide, and alkyl monoglyceryl ether. In particular, polyoxyethylene alkyl ether and polyoxyalkylene alkyl ether are preferred because of their high hydrophilicity and relatively good biodegradability.

Examples of the cationic surfactant include alkyltrimethylammonium salts and dialkyldimethylammonium salts.

Examples of the amphoteric surfactant include a carboxybetaine surfactant and a sulfobetaine surfactant.

Among the above surfactants, the anionic surfactants such as sodium dodecyl sulfate, sodium dodecylbenzenesulfonate, sodium cholate, sodium deoxycholate, and sodium oleate and the nonionic surfactants such as polyoxyethylene alkyl ether and polyoxyalkylene alkyl ether are preferred in terms of cost, the amount used, and the effect of addition.

The amount of the surfactant added is not particularly limited and is preferably 0.001 parts by weight or more and 10 parts by weight or less with respect to 100 parts by weight of the cell culture solution. Further, the amount of the surfactant added is more preferably 5 parts by weight or less in terms of cost. The above surfactants may be used alone or in combination of two or more.

The enzyme treatment may be performed by, e.g., adding the alkaline compound and/or the surfactant to the cell culture solution and stirring the mixture. The enzyme treatment conditions are preferably controlled at the optimal value of the enzyme to be used. The required amount of the enzyme depends on the type and activity of the enzyme. The amount of the enzyme is not particularly limited and is preferably 0.001 to 10 parts by weight with respect to 100 parts by weight of the PUB. Further, the amount of the enzyme is more preferably 0.001 to 5 parts by weight in terms of cost.

The physical disruption treatment is preferably performed after the addition of the alkaline compound or the addition of the alkaline compound and the surfactant from the viewpoint of improving the disruption effect and facilitating the recovery of the PUB. Any of the alkaline compounds and the surfactants described above may be appropriately used Among the above alkali compounds, sodium hydroxide, sodium carbonate, potassium hydroxide, and lithium hydroxide are preferred in terms of industrial production and cost reduction. Among the above surfactants, the anionic surfactants such as sodium dodecyl sulfate, sodium dodecylbenzenesulfonate, sodium cholate, sodium deoxycholate, and sodium oleate and the nonionic surfactants such as polyoxyethylene alkyl ether and polyoxyalkylene alkyl ether are preferred in terms of cost, the amount used, and the effect of addition.

It is preferable that the alkaline compound is added to adjust the pH of the cell culture solution to 8.0 or more and 12.5 or less. This allows, e.g., the residue of cells (microbial cells), the organic substances for cell production, or the organic substances constituting cells to be easily solubilized in the cell culture solution without affecting the PHB. After the addition of the alkaline compound, the cell culture solution may be treated at 20° C. or more and 80° C. or less, preferably at 20° C. or more and 50° C. or less for 30 minutes or more and 2 hours or less.

The amount of the surfactant added is not particularly limited and is preferably 0.001 parts by weight or more and 10 parts by weight or less with respect to 100 parts by weight of the cell culture solution. Further, the amount of the surfactant added is more preferably 5 parts by weight or less in terms of cost. The surfactants may be used alone or in combination of two or more.

The apparatus for the physical disruption treatment is not particularly limited and may be, e.g., a high-pressure homogenizer, an ultrasonic crusher, an emulsifying and dispersing machine, or a bead mill In particular, a high-pressure homogenizer is preferred in terms of disruption efficiency. Specifically, a high-pressure homogenizer that includes a pressure-resistant container with a small opening is more preferably used, in which a suspension is introduced into the pressure-resistant container and extruded through the opening under high pressure. This type of homogenizer may be, e.g., a high-pressure homogenizer model "PA2K" manufactured by Niro Soavi S. P. A. In the high-pressure homogenizer, microbial cells are subjected to a large shearing force and efficiently disrupted, so that PHB separation can be improved. Since high pressure is applied to the suspension at the opening and causes a momentary rise in temperature, the cell culture solution should be cooled, if necessary, by a common low-temperature constant temperature circulating bath to prevent the temperature from rising. The disruption treatment is preferably performed at 20° C. or more and 40° C. or less. This is because the molecular weight of the PHB is not substantially reduced in this temperature range. The pressure applied during high-pressure disruption is not particularly limited and is preferably 30 MPa or more and 60 MPa or less in terms of cost and disruption efficiency.

The process (a) may include both the chemical treatment and the physical disruption treatment. In this case, the physical disruption treatment is preferably performed after the chemical treatment from the viewpoint of improving the disruption effect. The process (a) may include only the physical disruption treatment in terms of cost.

The water used in the process (a) has a calcium ion concentration of 4.5 mg/L or less (preferably 3.0 mg/L or less and more preferably 2.0 mg/L or less). For example, the water with a calcium ion concentration of 4.5 mg/L or less (preferably 3.0 mg/L or less and more preferably 2.0 mg/L or less) is used when the surfactant, the alkaline compound, or the like is added. The water has a sodium ion concentration of preferably 450 mg/L or less, more preferably 250 mg/L or less, and further preferably 220 mg/L or less.

[Process (b)]

In the process (b), the polyhydroxybutyrate-based resin is separated from a composition, e.g., a cell disruption solution obtained by the process (a). The separation is not particularly limited, and any method such as filtration, sedimentation, or centrifugation may be used to perform solid-liquid separation so that the polyhydroxybutyrate-based resin can be recovered along with a water-insoluble component. The centrifugation method is preferred because it allows for industrial large-scale processing and continuous use.

A centrifuge is not particularly limited and is preferably a centrifugal settler that has a rotating container without a hole. For example, there are several types of the centrifugal settlers: disk centrifuge, tubular centrifuge, and decanter centrifuge. Due to a small difference in specific gravity between PHB particles and water, the disk centrifuge (intermittent discharge type and nozzle discharge type) is preferred which has a large sedimentation area and a high acceleration. When the PHB concentration in the cell disruption solution is high, the nozzle discharge type is particularly preferred. Moreover, the decanter centrifuge that has a set of disks to create a large sedimentation area is also preferred.

In the process (b), 500 parts by weight or more and 1000 parts by weight or less of an aqueous medium may be added to 100 parts by weight of the composition, e.g., the cell disruption solution obtained by the process (a) before the separation.

In process (b), the aqueous medium may be either water or a mixed solvent of water and a water-miscible organic solvent. The content of water in the aqueous medium is preferably 50% by weight or more, more preferably 70% by weight or more, further preferably 80% by weight or more, and particularly preferably 85% by weight or more. The water used in the process (b) has a calcium ion concentration of 4.5 mg/L or less, preferably 3.0 mg/L or less, and more preferably 2.0 mg/L or less. The water has a sodium ion concentration of preferably 450 mg/L or less, more preferably 250 mg/L or less, and further preferably 220 mg/L or less.

The water-miscible organic solvent is not particularly limited. Examples of the water-miscible organic solvent include the following: alcohols such as methanol, ethanol, 1-propanol, 2-propanol, 1-butanol, 2-butanol, iso-butanol, pentanol, hexanol, and heptanol; ketones such as acetone and methyl ethyl ketone; ethers such as tetrahydrofuran and dioxane; nitriles such as acetonitrile and propionitrile; amides such as dimethylformamide and acetamide; dimethyl sulfoxide; pyridine; and piperidine. In particular, methanol, ethanol, 1-propanol, 2-propanol, 1-butanol, 2-butanol, iso-butanol, acetone, methyl ethyl ketone, tetrahydrofuran, dioxane, acetonitrile, and propionitrile are preferred because they can easily be removed. Moreover, methanol, ethanol, 1-propanol, 2-propanol, butanol, and acetone are more preferred because they are readily available. Further, methanol, ethanol, and acetone are particularly preferred.

The process (b) may include washing the separated MB (i.e., the water-insoluble component containing the PUB) at least once with the above aqueous medium so that the PUB is purified. The washing may be carried out by, e.g., adding 500 parts by weight or more and 1000 parts by weight or less of the aqueous medium to 100 parts by weight of the water-insoluble component containing the polyhydroxybutyrate-based resin. In order to effectively remove impurities derived from the microbial cells and enhance the purification effect, the aqueous medium may be mixed with, e.g., an alkaline compound, a surfactant, and a proteolytic enzyme.

[Process (c)]

The production method of one or more embodiments of the present invention may include a process (c) of drying the separated PUB in the process (b). The PUB that has been washed with the aqueous medium and dehydrated (i.e., the dehydrated resin) can be dried without any further treatment, resulting in a powdered PUB. The drying method may be appropriately selected and is not particularly limited For example, common drying methods such as spray drying, air flow drying, fluidized drying, and band drying are suitably used.

Alternatively, the PHB that has been washed with the aqueous medium and concentrated may be mixed with a dispersant to adjust the pH to 7 or less. Then, the PUB dispersion can be dried to form a powdered PHB. Examples of the dispersant include the following: water-soluble polymers such as polyvinyl alcohol (PVA), methyl cellulose, ethyl cellulose, hydroxymethyl cellulose, hydroxyethyl cellulose, polyacrylic acid, sodium polyacrylate, potassium polyacrylate, polymethacrylic acid, and sodium polymethacrylate; and nonionic surfactants such as a polyethylene glycol-polypropylene glycol block ether (polyoxyethylene-polyoxypropylene block polymer) nonionic surfactant. The pH may be adjusted to 7 or less by, e.g., the addition of an acid. The acid is not particularly limited and may be either an organic or inorganic acid. For example, a sulfuric acid, a hydrochloric acid, a phosphoric acid, or an acetic acid may be appropriately used.

The molecular weight of the PHB is not particularly limited as long as the PHB has substantially sufficient physical properties for the intended use. For example, the weight average molecular weight of the PHB is preferably 50,000 or more and 3,000,000 or less, and more preferably 60,000 or more and 1,500,000 or less in terms of moldability and the strength of a molded product. In this case, the weight average molecular weight can be determined from the polystyrene equivalent molecular weight distribution measured by gel permeation chromatography (GPC) using a chloroform eluent. Any column that is suitable for the measurement of the molecular weight may be used in the GPC.

The PUB has high thermal stability. When the PUB is heat-treated at 160° C. for 20 minutes, a weight average molecular weight retention of the PHB is preferably 70% or more, more preferably 75% or more, even more preferably 80% or more, further preferably 85% or more, and particularly preferably 90% or more.

The PUB has good color tone. When the PUB is press molded at 160° C. to form a sheet with a thickness 15 mm, a yellow index (YI value) of the sheet is preferably 20 or less, and more preferably 17 or less.

The PUB can be molded into various molded products, including, e.g., fibers, yarns, ropes, woven fabrics, knitted fabrics, non-woven fabrics, papers, films, sheets, tubes, plates, rods, containers, bags, parts, and foams. The molded products may be suitably used in, e.g., agriculture, fishing, forestry, horticulture, medicine, hygiene, clothing, non-clothing, packaging, and other fields.

To obtain other biodegradable plastics produced by microorganisms, the water with a calcium ion concentration of 4.5 mg/L or less can also be used in the process of disrupting or solubilizing microbial cells containing a biodegradable plastic and the process of separating the biodegradable plastic.

EXAMPLES

Hereinafter, the present invention will be described in more detail by way of examples. However, the present invention is not limited to the following examples.
[Measurement and Evaluation Methods]
The measurement and evaluation methods in Examples and Comparative Examples will be described below.

(Color)
First, 200 mL of wash water prepared was placed in a dedicated measuring container. Then, a measuring device (TCR-5Z manufactured by Kasahara Chemical Instruments Corp) was slowly immersed in the wash water so as not to have air bubbles, and the color of the wash water was measured. The color of tap water is 5 degrees or less in accordance with the "Drinking Water Quality Standards" of the Ministry of Health, Labor and Welfare.
(Thermal Stability)
The thermal stability was evaluated based on the weight average molecular weight retention of the polyhydroxybutyrate-based resin after it was heated at 160° C. for 20 minutes. If the weight average molecular weight retention was 70% or more, the thermal stability of the polyhydroxybutyrate-based resin was considered to be good. If the weight average molecular weight retention was less than 70%, the thermal stability of the polyhydroxybutyrate-based resin was considered to be poor.

Weight average molecular weight retention (%)= (Weight average molecular weight of PHB after heating/Weight average molecular weight of PHB before heating)×100

<Weight Average Molecular Weight of PHB before Heating>
First, 10 mg of polyhydroxybutyrate-based resin powder was dissolved in 10 mL of chloroform. Then, the solution was filtered to remove the insoluble matter. This solution (filtrate) was measured to determine the molecular weight by using the chloroform as a mobile phase in a GPC system manufactured by SHIMADZU CORPORATION, which was equipped with "Shodex K805L (two connected columns, each 300×8 mm)" manufactured by Showa Denko KK In this case, commercially available standard polystyrene was used as a molecular weight standard sample.
<Weight Average Molecular Weight of PHB after Heating>
The polyhydroxybutyrate-based resin powder was pre-heated at 160° C. for 7 minutes, and then heated at 160° C. for 20 minutes to form a polyhydroxybutyrate-based resin sheet. The weight average molecular weight of the PHB after heating was measured in the same manner as the measurement of the weight average molecular weight of the PHB before heating, except that 10 mg of the polyhydroxybutyrate-based resin sheet was used.
(Composition of PHB before Heating)
About 20 mg of polyhydroxybutyrate-based resin powder was mixed with 2 mL of a mixed solution of sulfuric acid and methanol (at a ratio of 15:85) and 2 mL of chloroform in a container, and the container was hermetically sealed. The mixture was heated at 100° C. for 140 minutes to produce a methyl ester of a polyester decomposition product. After cooling, this solution was neutralized by the dropwise addition of 1.5 g of sodium hydrogen carbonate, and then allowed to stand until the generation of carbon dioxide gas was stopped. Further, the solution was well mixed with 4 mL of diisopropyl ether, and then centrifuged. Subsequently, the composition of a hydroxyalkanoic acid methyl ester of the polyester decomposition product in the supernatant was analyzed by capillary gas chromatography, and the monomer unit composition (content) of the polyester thus obtained was determined. The capillary gas chromatography was performed by using GC-17A manufactured by SHIMADZU CORPORATION as a gas chromatograph and NEUTRA BOND-1 (column length: 25 m, column inner diameter: 0.25 mm, liquid film thickness: 0.4 μm) manufactured by GL Sciences Inc. as a capillary column. The temperature was increased from the initial temperature of 100° C. to 200° C. at a rate 8° C. min, and further increased from 200° C. to 290° C. at a rate of 30° C./min.

(Measurement of Yellow Index (YI value))

A press sheet of the polyhydroxybutyrate-based resin was used as a measurement sample. The press sheet was prepared in the following manner. First, 3.0 g of polyhydroxybutyrate-based resin powder was sandwiched between metal plates of 15 cm square, and a 0.5 mm thick metal plate was inserted into each of four corners of the metal plates. This material was set in a small pressing machine for experiment (H-15 manufactured by Takabayashi Rika Co., Ltd.), heated at 160° C. for 7 minutes, and then pressed at about 5 MPa for 2 minutes while heating at 160° C. The pressed material was allowed to stand at room temperature so that the polyhydroxybutyrate-based resin was cured. Using a color difference meter "SE-2000" (manufactured by NIPPON DENSHOKU INDUSTRIES CO., LTD), the YI value of the press sheet thus obtained was measured by placing the press sheet on a 30 mm measuring plate and covering it with a white standard plate. If the YI value was 20 or less, the color tone of the press sheet was considered to be good. If the YI value was more than 20, the color tone of the press sheet was considered to be poor.

Production Example 1 of Wash Water

The wastewater discharged from the production of the polyhydroxybutyrate-based resin was subjected to microbial anaerobic and aerobic treatments, subsequently pre-filtration by the membrane bioreactor process using a UF membrane, and further filtration with an RO membrane. In the anaerobic treatment, high-molecular-weight carbohydrates and lipids were decomposed into organic acids and lower alcohols by the action of acid-producing bacteria in the add-producing tank (at a pH of about 7.1), and the organic adds and lower alcohols were then decomposed into methane gas and carbon dioxide gas by the action of granular methane-produdng bacteria in the methane-producing tank (EGSB reactor, under a load of 15 kg-CODcr/m$^3$/d). In the aerobic treatment, the organic substances that had not been decomposed by the anaerobic treatment were decomposed by the action of aerobic bacteria in the apparatus inducing the denitrification tank (activated sludge treatment tank), the aeration tank (activated sludge treatment tank), the second denitrification tank (activated sludge treatment tank), and the re-aeration tank (activated sludge treatment tank). In the pre-filtration by the membrane bioreactor process, the UF membrane (hollow fiber membrane: PVDF, manufactured by Mitsubishi Chemical Corporation, nominal pore size: 0.05 μm, MgSO$_4$ rejection rate at 20° C. and 3000 kPa: 0%) was installed in the re-aeration tank (activated sludge treatment tank). The UF membrane allowed water to pass through it at a filtration linear velocity of 0.86 to 1.15 m/day. The effluent through the UF membrane was collected and forced through the RO membrane (material: composite polyamide, manufactured by Nitto Denko Corporation, MgSO$_4$ rejection rate at 20° C. and 3000 kPa: 99.7%) at a water temperature of 30° C., a transmembrane pressure difference (permeation pressure) of 0.7 to 1.15 MPa, and a permeation rate of 0.75 to 0.85 L/min. The water that had passed through the RO membrane was used as wash water, while the water that had not passed through the RO membrane was returned back to the water collection tank The effluent through the UF membrane was filtered through the RO membrane for 97 minutes, and thus 70% by weight of the effluent through the UF membrane passed through the RO membrane. The effluent through the RO membrane was collected during the first 13 minutes after the start of the filtration, so that wash water 1 was obtained.

Production Example 2 of Wash Water

Wash water 2 was obtained in the same manner as Production Example 1 except that the effluent through the RO membrane was collected during a period from 90 to 97 minutes after the start of the filtration.

Production Example 3 of Wash Water

The water that had passed through the RO membrane under the same conditions as Production Example 1 was further filtered through an RO membrane (material: composite polyamide, manufactured by Nitto Denko Corporation, MgSO$_4$ rejection rate at 20° C. and 3000 kPa: 99.7%) at a water temperature of 30° C., a permeation pressure of 0.8 MPa, and a permeation rate of 1.25 Thus, wash water 3 was obtained. The water passing through the RO membrane accounted for 90% of the effluent though the UF membrane.

Production Example 4 of Wash Water

The effluent through the UF membrane was collected under the same conditions as Production Example 1 and used as wash water 4.

Production Example 5 of Wash Water

The effluent through the UF membrane was collected under the same conditions as Production Example 1 and forced through an NF membrane (material: composite polyamide, manufactured by Synder Filtration, Inc., MgSO$_4$ rejection rate at 20° C. and 3000 kPa: 96.1%) at a water temperature of 20° C., a permeation pressure of 3 MPa, and a permeation rate of 30 to 300 g/hour. The effluent through the NF membrane was collected and used as wash water 5. The water passing through the NF membrane accounted for 75% of the effluent through the UF membrane.

Production Example 6 of Wash Water

Industrial water (manufactured by KANEKA CORPORATION) was treated with ion-exchange resins (strongly acidic cation exchange resin and strongly basic anion exchange resin, manufactured by ORGANO CORPORATION). Thus, wash water 6 was obtained.

Production Example 7 of Wash Water

The effluent through the UF membrane was collected under the same conditions as Production Example 1 and forced through an NF membrane (material: composite polyamide, manufactured by Synder Filtration, Inc., MgSO$_4$ rejection rate at 20° C. and 3000 kPa: 6.7%) at a water temperature of 20° C., a permeation pressure of 3 MPa, and a permeation rate of 100 to 550 g/hour. The effluent through the NF membrane was collected and used as wash water 7. The water passing through the NF membrane accounted for 75% of the effluent through the UF membrane.

Table 1 shows the calcium ion concentration, sodium ion concentration, and color of the wash waters in Production Examples 1 to 7.

TABLE 1

| Wash water | Calcium ion concentration (mg/L) | Sodium ion concentration (mg/L) | Color (degree) |
| --- | --- | --- | --- |
| 1 | 0.01 | 4.3 | 0 |
| 2 | 0.01 | 10 | 0 |
| 3 | 0.02 | less than 0.5 | 0 |
| 4 | 23 | 650 | more than 55 |
| 5 | 1.4 | 218.1 | 0.5 |
| 6 | 1.1 | less than 0.5 | 0.2 |
| 7 | 4.6 | 480.0 | 2.9 |

Example 1

(Preparation of Cell Culture Solution)

A *Raistonia eutropha* KNK-005 strain described in paragraph [0049] of WO 2008/010296 A1 was cultured by the method described in paragraphs [0050] to [0053] of the same document. Thus, a cell culture solution was prepared in which cells containing PUB (poly(3-hydroxybutyrate-co-3-hydroxyhexanoate) with a 3HH content of 11.5 mol %) were grown. At present, *Raistonia eutwphais* classified as *Cupriavidus necator*.

(Sterilization Treatment)

A sterilization treatment was performed by heating and stirring the above cell culture solution at a temperature of 60 to 80° C. for 20 minutes.

(Processes (a) and (b))

Sodium dodecyl sulfate was added at a concentration of 0.2% by weight to the sterilized cell culture solution thus obtained Moreover, this solution was mixed with wash water in which sodium hydroxide was dissolved to adjust the pH to 11.0. The solution was kept warm at 50° C. for 1 hour. Then, the solution was subjected to high-pressure disruption at 44 to 54 MPa by using a high-pressure crusher (high-pressure homogenizer model PA2K manufactured by Niro Soavi SPA).

The cell disruption solution thus obtained was mixed with the same weight of wash water. Then, the solution was centrifuged, and the supernatant was removed and concentrated 2 times. The concentrated PHB aqueous suspension was mixed with wash water (pH 11.0) containing sodium hydroxide so that the weight of the wash water was the same as that of the supernatant removed. Then, the suspension was centrifuged, and the supernatant was removed and suspended by the addition of wash water. This suspension was mixed with 0.2% by weight of sodium dodecyl sulfate and protease ("Esperase" manufactured by Novozymes Japan Ltd.) in an amount corresponding to 1/100 weight of the PHB. The suspension was stirred for 2 hours while it was maintained at a pH of 10.0 and a temperature of 50° C. Then, the suspension was centrifuged, and the supernatant was removed and concentrated 5 times. The concentrated PHB aqueous suspension was mixed with wash water (pH 11.0) containing sodium hydroxide so that the weight of the wash water was the same as that of the supernatant removed. Then, the suspension was centrifuged. After repeating the same operation 5 times, the supernatant was removed and adjusted so that the concentration of the polyhydroxybutyrate-based resin was 52% by weight.

The wash water used in the processes (a) and (b) was the wash water 1.

(Process (c))

The resulting aqueous suspension of the polyhydroxybutyrate-based resin (solid content concentration 52% by weight) was mixed with 1 phr (i.e., 1 part by weight with respect to 100 parts by weight of the polyhydroxybutyrate-based resin present in the aqueous suspension) of a dispersant (polyethylene glycol-polypropylene glycol block ether nonionic surfactant, "PLONON 208" (trade name) manufactured by NOF CORPORATION). Subsequently, the solid content concentration was adjusted to 30% by weight with distilled water. This solution was stirred for 30 minutes, and then sulfuric acid was added until the pH of the solution was stable at 4. The aqueous suspension of the polyhydroxybutyrate-based resin thus obtained was dried at 60° C. for 12 hours, so that polyhydroxybutyrate-based resin powder was produced.

Example 2

Polyhydroxybutyrate-based resin powder was produced in the same manner as Example 1 except that the wash water 2 was used in the processes (a) and (b).

Example 3

Polyhydroxybutyrate-based resin powder was produced in the same manner as Example 1 except that the wash water 3 was used in the processes (a) and (b).

Comparative Example 1

Polyhydroxybutyrate-based resin powder was produced in the same manner as Example 1 except that the wash water 4 was used in the processes (a) and (b).

Example 4

Polyhydroxybutyrate-based resin powder was produced in the same manner as Example 1 except that (i) a cell culture solution was prepared that contained cells containing PHB (poly(3-hydroxybutyrate-co-3-hydroxyhexanoate) with a 3HH content of 10.9 mol %), and (ii) the wash water 2 was used in the processes (a) and (b).

Example 5

Polyhydroxybutyrate-based resin powder was produced in the same manner as Example 4 except that the wash water 5 was used in the processes (a) and (b).

Example 6

Polyhydroxybutyrate-based resin powder was produced in the same manner as Example 4 except that the wash water 6 was used in the processes (a) and (b).

Comparative Example 2

Polyhydroxybutyrate-based resin powder was produced in the same manner as Example 4 except that the wash water 7 was used in the processes (a) and (b).

Comparative Example 3

Polyhydroxybutyrate-based resin powder was produced in the same manner as Example 4 except that the wash water 4 was used in the processes (a) and (b).

The thermal stability and the YI value of the polyhydroxybutyrate-based resin powders in Examples and Comparative Examples were measured and evaluated as described above. Table 2 shows the results. In Table 2, the 3HH content before heating means the content of 3HH in the polyhydroxybutyrate-based resin before heating.

TABLE 2

|  | Weight average molecular weight before heating | 3HH content before heating (mol %) | Weight average molecular weight after heating | Weight average molecular weight retention (%) | Thermal stability | YI value |
|---|---|---|---|---|---|---|
| Ex. 1 | 666944 | 11.5 | 508862 | 76 | good | 14.5 |
| Ex. 2 | 657758 | 11.5 | 617295 | 94 | good | 15.4 |
| Ex. 3 | 682112 | 11.5 | 522472 | 77 | good | 14.2 |
| Comp. Ex. 1 | 644416 | 11.5 | 222779 | 35 | poor | 22.1 |
| Ex. 4 | 564464 | 10.9 | 472025 | 84 | good | 15.6 |
| Ex. 5 | 598587 | 10.9 | 512066 | 86 | good | 16.8 |
| Ex. 6 | 584498 | 10.9 | 449739 | 75 | good | 18.6 |
| Comp. Ex. 2 | 587767 | 10.9 | 505621 | 77 | good | 38.1 |
| Comp. Ex. 3 | 580181 | 10.9 | 351503 | 61 | poor | 40.1 |

In Examples, each of the polyhydroxybutyrate-based resin powders has high thermal stability and good color tone, since the wash water with a calcium ion concentration of 4.5 mg/L or less is used in the processes (a) and (b). In addition, the lower the calcium ion concentration in the wash water, the higher the thermal stability and the better the color tone. In Comparative Example 2, the YI value exceeds the reference value, although water with high transparency is used. This indicates that the calcium ion concentration has a greater effect on the YI value of the polyhydroxybutyrate-based resin powder. In particular, the wash water used in Examples 1 to 5 is the treated water originated from the wastewater that has been discharged during the production of the polyhydroxybutyrate-based resin. Nevertheless, the polyhydroxybutyrate-based resin powders in Examples 1 to 5 are superior in both thermal stability and color tone. The results confirm that Examples 1 to 5 can provide the polyhydroxybutyrate-based resin with good color tone and high thermal stability while saving the amount of water used and reducing the environmental impact.

The present invention includes, e.g., the following one or more embodiments, but is not limited thereto.

[1] A method for producing a polyhydroxybutyrate-based resin, comprising:
(a) disrupting or solubilizing microbial cells containing a polyhydroxybutyrate-based resin; and
(b) separating the polyhydroxybutyrate-based resin from a composition obtained by the process (a),
wherein the process (a) and the process (b) use water with a calcium ion concentration of 4.5 mg/L or less.

[2] The method according to [1], wherein the water used in the process (a) and the process (b) has a sodium ion concentration of 450 mg/L or less.

[3] The method according to [1] or [2], wherein the water used in the process (a) and the process (b) is obtained by subjecting wastewater that is discharged from a production process of the polyhydroxybutyrate-based resin to microbial anaerobic and aerobic treatments, subsequently pre-filtration by a membrane bioreactor process, and further filtration with a calcium ion removal membrane.

[4] The method according to any one of [1] to [3], wherein the calcium ion removal membrane is one or more selected from the group consisting of an NF membrane and an RO membrane.

[5] The method according to [4], wherein an MgSO₄ rejection rate of the NF membrane or the RO membrane at a temperature of 20° C. and under a pressure of 3000 kPa is 60% or more and 100% or less.

[6] The method according to any one of [1] to [5], wherein the process (a) includes at least one treatment selected from the group consisting of a chemical treatment and a physical disruption treatment.

[7] The method according to [6], wherein the chemical treatment uses at least one selected from the group consisting of an alkaline compound, a proteolytic enzyme, and a cell wall degrading enzyme.

[8] The method according to any one of [1]t° [7], wherein the polyhydroxybutyrate-based resin is poly(3-hydroxybutyrate-co-3-hydroxyhexanoate).

[9] The method according to any one of pi to [8], wherein the polyhydroxybutyrate-based resin has a weight average molecular weight retention of 70% or more when heat-treated at 160° C. for 20 minutes.

[10] The method according to any one of [1] to [9], wherein the polyhydroxybutyrate-based resin is press molded at 160° C. to form a sheet with a thickness of 5 mm, and a yellow index (YI value) of the sheet is 20 or less.

The invention claimed is:
1. A method for producing a polyhydroxybutyrate-based resin, comprising:
disrupting or solubilizing microbial cells comprising a polyhydroxybutyrate-based resin, thereby obtaining a composition comprising the polyhydroxybutyrate-based resin; then
separating the polyhydroxybutyrate-based resin from the composition and discharging the remaining liquid waste as wastewater,
subjecting the wastewater discharged from the composition to microbial anaerobic and aerobic treatment,
pre-filtering the wastewater obtained from the microbial anaerobic and aerobic treating using a membrane bioreactor process,
filtrating the pre-filtered wastewater with a calcium ion removal membrane, thereby obtaining water, and
reusing the obtained water in the disrupting or solubilizing and the separating in the production of polyhydroxybutyrate-based resin,
wherein the water has a calcium ion concentration of 4.5 mg/L or less,
wherein the calcium ion removal membrane is at least one selected from the group consisting of a nanofiltration (NF) membrane and a reverse osmosis (RO) membrane, and
wherein an MgSO₄ rejection rate of the NF membrane or the RO membrane at a temperature of 20° C. and under a pressure of 3000 kPa is from 60% to 100%.

2. The method according to claim 1, wherein the water used in the disrupting or solubilizing and the separating has a sodium ion concentration of 450 mg/L or less.

3. The method according to claim 1, wherein the disrupting or solubilizing comprises at least one treatment selected from the group consisting of a chemical treatment and a physical disruption treatment.

4. The method according to claim 3, wherein the chemical treatment uses at least one selected from the group consisting of an alkaline compound, a proteolytic enzyme, and a cell wall degrading enzyme.

5. The method according to claim 3, wherein the physical disruption treatment is performed after an alkaline compound, or an alkaline compound and a surfactant, is/are added to the microbial cells.

6. The method according to claim 1, wherein the polyhydroxybutyrate-based resin is poly(3-hydroxybutyrate-co-3-hydroxyhexanoate).

7. The method according to claim 1, wherein the polyhydroxybutyrate-based resin has a weight average molecular weight retention of at least 70% when heat-treated at 160° C. for 20 minutes.

8. The method according to claim 1, wherein when the polyhydroxybutyrate-based resin is press molded at 160° C. to form a sheet with a thickness of 5 mm, a yellow index (YI value) of the sheet is 20 or less.

9. The method according to claim 1, further comprising: drying the separated polyhydroxybutyrate-based resin.

10. The method according to claim 1, wherein the $MgSO_4$ rejection rate of the NF membrane or the RO membrane at a temperature of 20° C. and under a pressure of 3000 kPa is from 70% to 100%.

11. The method according to claim 1, wherein the $MgSO_4$ rejection rate of the NF membrane or the RO membrane at a temperature of 20° C. and under a pressure of 3000 kPa is from 90% to 100%.

12. The method according to claim 1, wherein a transmembrane pressure difference of the NF membrane or the RO membrane during the filtering is from 0.4 MPa to 4.14 MPa.

13. The method according to claim 1, wherein a permeation rate of the NF membrane or the RO membrane during the filtering is from 0.01 L/min to 2,000 L/min.

14. A method for producing a polyhydroxybutyrate-based resin, comprising:
- disrupting or solubilizing microbial cells comprising a polyhydroxybutyrate-based resin;
- separating the polyhydroxybutyrate-based resin from the composition,
- drying the separated polyhydroxybutyrate-based resin, thereby producing the polyhydroxybutyrate-based resin, and discharging liquid waste as wastewater from the production of polyhydroxybutyrate-based resin,
- subjecting the wastewater discharged from the production of polyhydroxybutyrate-based resin to microbial anaerobic and aerobic treatment,
- pre-filtering the wastewater obtained from the microbial anaerobic and aerobic treating using a membrane bioreactor process,
- filtrating the pre-filtered wastewater with a calcium ion removal membrane, thereby obtaining water, and
- reusing the obtained water in the production of the polyhydroxybutyrate-based resin,
- wherein the water has a calcium ion concentration of 4.5 mg/L or less,
- wherein the calcium ion removal membrane is at least one selected from the group consisting of a nanofiltration (NF) membrane and a reverse osmosis (RO) membrane, and
- wherein an $MgSO_4$ rejection rate of the NF membrane or the RO membrane at a temperature of 20° C. and under a pressure of 3000 kPa is from 60% to 100%.

* * * * *